US012761189B2

(12) United States Patent
Nishikino et al.

(10) Patent No.: US 12,761,189 B2
(45) Date of Patent: Oct. 13, 2026

(54) EXCITATION DEVICE, INSPECTION SYSTEM, AND EXCITATION METHOD

(71) Applicant: NATIONAL INSTITUTES FOR QUANTUM SCIENCE AND TECHNOLOGY, Chiba (JP)

(72) Inventors: Masaharu Nishikino, Chiba (JP); Toshiyuki Kitamura, Chiba (JP)

(73) Assignee: National Institutes for Quantum Science and Technology, Chiba (JP)

( * ) Notice: Subject to any disclaimer, the term of this patent is extended or adjusted under 35 U.S.C. 154(b) by 280 days.

(21) Appl. No.: 18/697,052

(22) PCT Filed: Aug. 19, 2022

(86) PCT No.: PCT/JP2022/031309

§ 371 (c)(1),
(2) Date: Mar. 29, 2024

(87) PCT Pub. No.: WO2023/053765

PCT Pub. Date: Apr. 6, 2023

(65) Prior Publication Data

US 2025/0035590 A1 Jan. 30, 2025

(30) Foreign Application Priority Data

Oct. 1, 2021 (JP) ................................ 2021-163076

(51) Int. Cl.
*G01N 29/24* (2006.01)
*G01N 29/04* (2006.01)
*G02B 19/00* (2006.01)

(52) U.S. Cl.
CPC ......... *G01N 29/2418* (2013.01); *G01N 29/04* (2013.01); *G02B 19/0009* (2013.01); *G02B 19/0047* (2013.01)

(58) Field of Classification Search
CPC .. G01N 29/2418; G01N 29/04; G01N 29/343; G02B 19/0009; G02B 19/0047; G01M 7/02; G01M 7/08
See application file for complete search history.

(56) References Cited

U.S. PATENT DOCUMENTS

2007/0012669 A1* 1/2007 Mori .................... B23K 26/142 219/121.84
2009/0084399 A1* 4/2009 Lee .................... H10P 72/0406 134/201

(Continued)

FOREIGN PATENT DOCUMENTS

JP 2000061414 A 2/2000
JP 2004077163 A 3/2004

(Continued)

OTHER PUBLICATIONS

Dunbar Thomas et al: "Pressure amplification of laser induced plasma shockwaves with shock tubes for nanoparticle removal", Journal of Adhesion Science and Technology, vol. 21, No. 1, Jan. 1, 2007 (Jan. 1, 2007), pp. 67-80, XP093306570, GB ISSN: 0169-4243, DOI: 10.1163/156856107779976105.

(Continued)

*Primary Examiner* — Xin Y Zhong
(74) *Attorney, Agent, or Firm* — NK Patent Law

(57) ABSTRACT

In a technique to vibrate a target using a laser induced plasma shock wave, in order to enhance efficiency of vibrating a target as compared with a conventional technique, a vibration device includes a condenser lens, and a shock tube in which a first end of an internal space is sealed by the condenser lens and a second end of the internal space is opened. The condenser lens condenses supplied laser light in the internal space of the shock tube. The shock tube outputs the laser induced plasma shock wave from the second end.

5 Claims, 12 Drawing Sheets

(56) References Cited

U.S. PATENT DOCUMENTS

| | | | | |
|---|---|---|---|---|
| 2013/0090868 A1* | 4/2013 | Kajiwara | G01N 29/36 | |
| | | | 702/56 | |
| 2019/0039179 A1* | 2/2019 | Yu | B23K 26/70 | |

FOREIGN PATENT DOCUMENTS

| | | |
|---|---|---|
| JP | 2005338063 A | 12/2005 |
| WO | 2011158503 A1 | 12/2011 |

OTHER PUBLICATIONS

EPO, Extended European Search Report for European Patent Application No. 22875638.3, dated Sep. 17, 2025.

WIPO, International Preliminary Report on Patentability for corresponding International Patent Application No. PCT/JP2022/031309, dated Apr. 2, 2024, 8 pages.

ISA/JP, International Search Report for corresponding International Patent Application No. PCT/JP2022/031309, mailed Nov. 8, 2022, 4 pages.

Hosoya, Naoki, et al., "Non-destructive firmness assessment of apples using a non-contact laser excitation system based on a laser-induced plasma shock wave" Postharvest Biology and Technology, 128 (pp. 11-17), published Feb. 12, 2017, 7 pages.

* cited by examiner

EXCITATION DEVICE, INSPECTION SYSTEM, AND EXCITATION METHOD

CROSS-REFERENCE TO RELATED APPLICATIONS

This application is a U.S. National Stage Application of International Patent Application No. PCT/JP2022/031309, filed on Aug. 19, 2022, which claims priority to Japanese Patent Application No. 2021-163076, filed on Oct. 1, 2021, the entire contents of all of which are incorporated by reference herein.

TECHNICAL FIELD

The present invention relates to a vibration device and a vibration method. The present invention also relates to an inspection system provided with the vibration device.

BACKGROUND ART

A laser hammering test is known as a non-contact and non-destructive method for inspecting whether a defect has occurred inside a structure such as a road tunnel. The laser hammering test is a technique to replace a hammering test using a hammer. In the laser hammering test, laser ablation is generated on a surface of a target by irradiating the target such as a wall surface of a tunnel with pulsed laser light. The target is vibrated by a reaction of the laser ablation. However, in this laser ablation method, a trace of ablation remains as a scratch on the surface of the target.

As a vibration method that does not scratch a target while using a laser, a laser induced plasma (LIP) shock wave method is known (see Patent Literature 1). In the LIP shock wave method, pulsed laser light is emitted to a space in the vicinity of a target. Thus, laser induced breakdown (LIB) occurs in the space in the vicinity of the target. LIP is plasma induced by LIB. An LIP shock wave is a shock wave caused by LIP. In the LIP shock wave method, the LIP shock wave is used to vibrate the target.

CITATION LIST

Patent Literature

[Patent Literature 1]
International Publication No. WO 2011/158503

SUMMARY OF INVENTION

Technical Problem

However, in a case where a laser having the same power is used, a power of vibration obtained by the LIP shock wave method is smaller than that of vibration obtained by the laser ablation method. The present invention is accomplished in view of the above problem, and an object thereof is, in a technique to vibrate a target using an LIP shock wave, to enhance efficiency of vibrating the target as compared with a conventional technique.

Solution to Problem

In order to attain the object, a vibration device in accordance with an aspect of the present invention includes: a condenser lens; and a shock tube in which a first end of an internal space is sealed by the condenser lens and a second end of the internal space is opened, laser light being supplied to the shock tube via the condenser lens, and a laser induced plasma shock wave being output from the second end. In the vibration device, the condenser lens is configured to condense the laser light in the internal space of the shock tube.

In order to attain the object, an inspection system in accordance with an aspect of the present invention includes: the vibration device in accordance with any one of the above aspects 1 through 3, the vibration device vibrating a target with use of the laser induced plasma shock wave; and a vibration measurement device that measures vibration on a surface of the target.

In order to attain the object, a vibration method in accordance with an aspect of the present invention is a vibration method for generating a laser induced plasma shock wave with use of a shock tube in which a first end of an internal space is sealed by a condenser lens and a second end of the internal space is opened. The vibration method includes: a first step of emitting laser light toward the condenser lens; a second step of condensing the laser light in the internal space of the shock tube to generate a laser induced plasma shock wave; and a third step of outputting the laser induced plasma shock wave from the second end.

Advantageous Effects of Invention

According to an aspect of the present invention, it is possible, in a technique to vibrate a target using an LIP shock wave, to enhance efficiency of vibrating the target as compared with a conventional technique.

Figure 1:
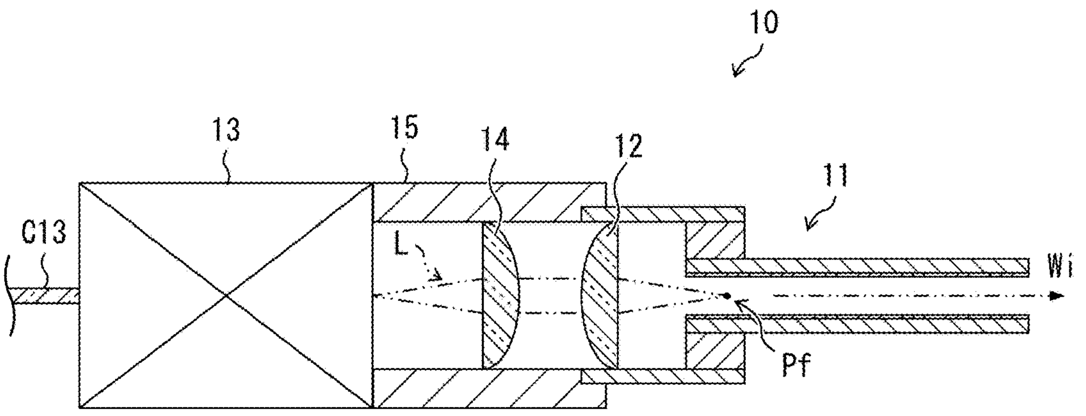
FIG. 1 is a longitudinal sectional view illustrating a vibration device in accordance with Embodiment 1 of the present invention.
Figure 2:
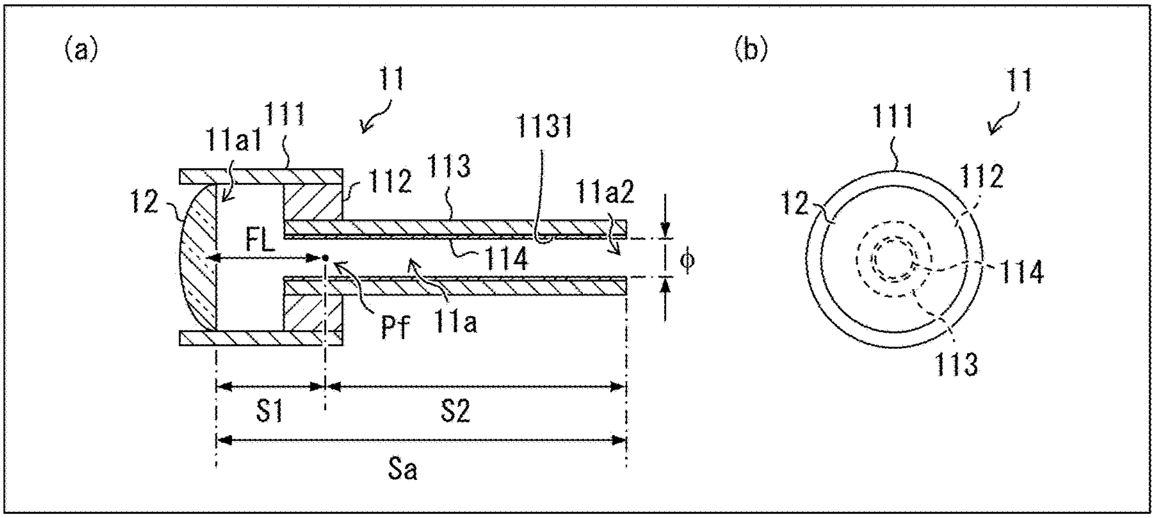

(a) of FIG. 2 is a longitudinal sectional view illustrating a shock tube and a condenser lens which are included in the vibration device illustrated in FIG. 1. (b) of FIG. 2 is a plan view illustrating the shock tube illustrated in (a) of FIG. 2, the plan view being obtained when a first end of the shock tube is seen in plan view.

Figure 3:
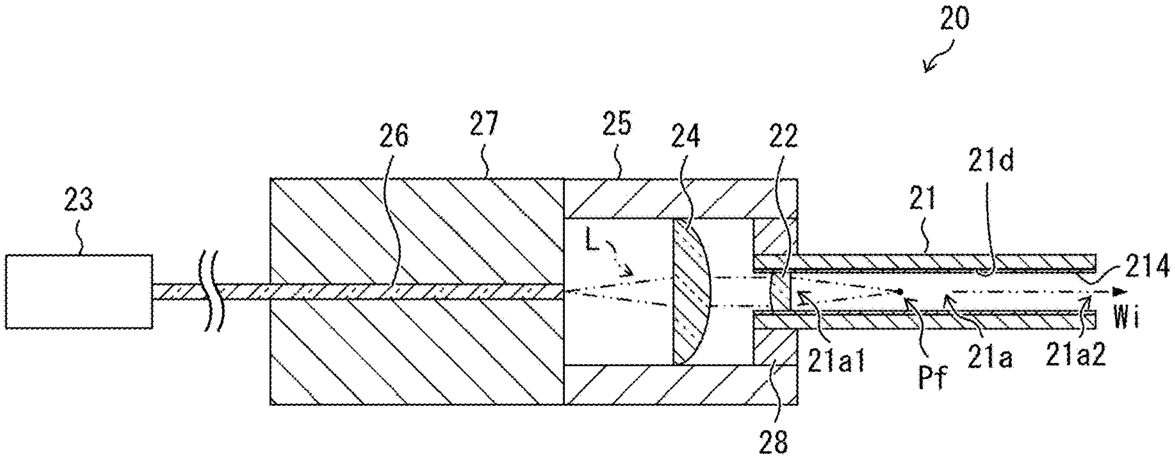

FIG. 3 is a longitudinal sectional view illustrating a variation of the vibration device illustrated in FIG. 1.

Figure 4:
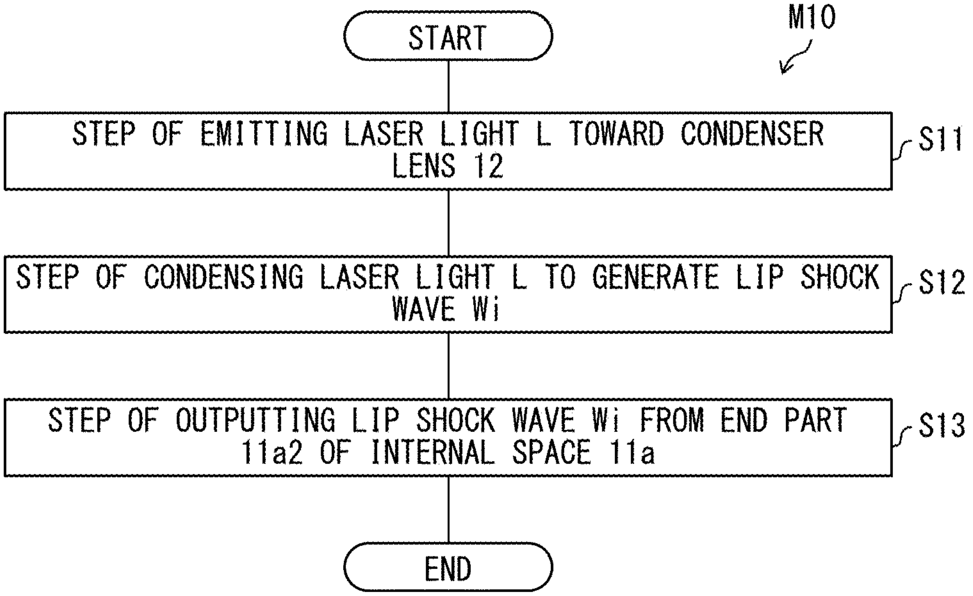

FIG. 4 is a flowchart illustrating a vibration method which is carried out by the vibration device illustrated in FIG. 1.

Figure 5:
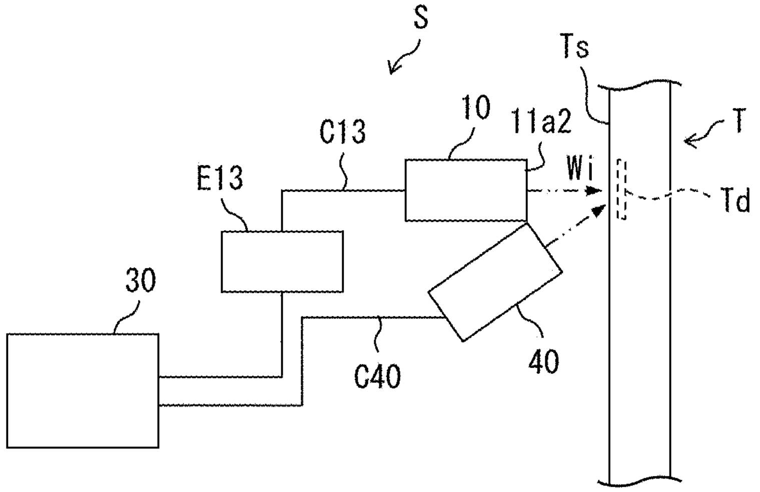

FIG. 5 is a block diagram illustrating an inspection system in accordance with Embodiment 2 of the present invention.

Figure 6:
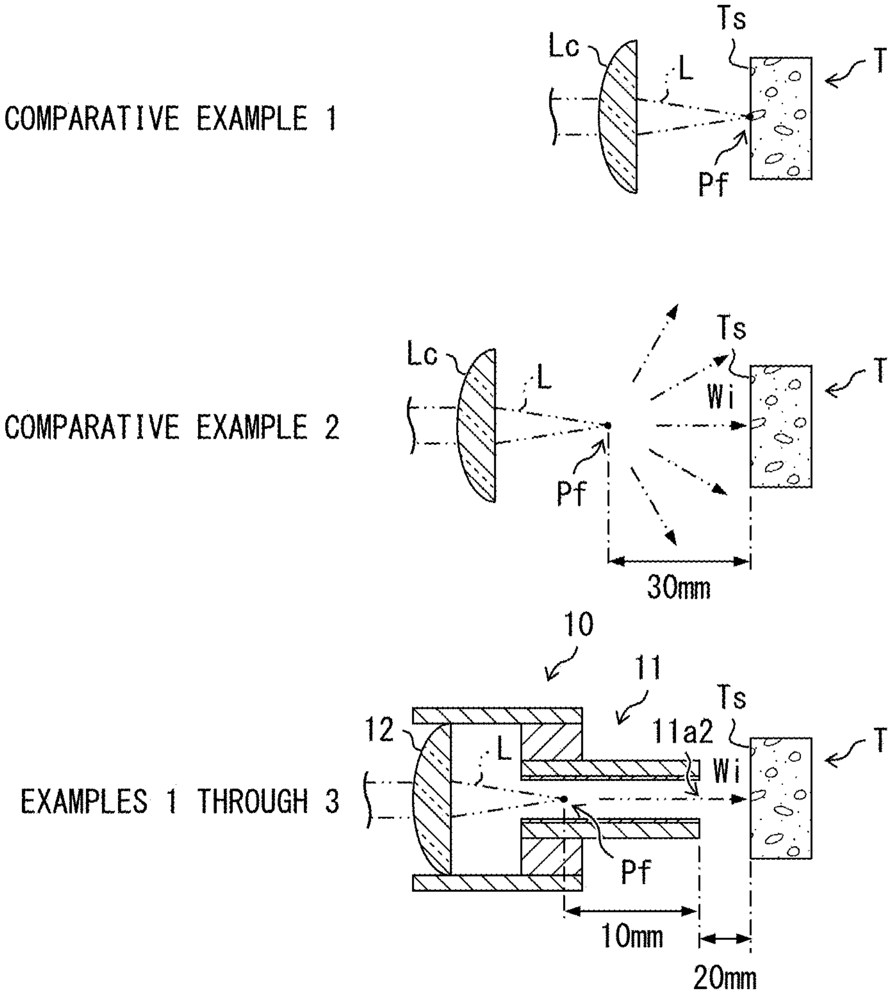

FIG. 6 is a schematic diagram illustrating vibration methods of Comparative Example 1, Comparative Example 2, and Examples 1 through 3 of the present invention.

Figure 7:
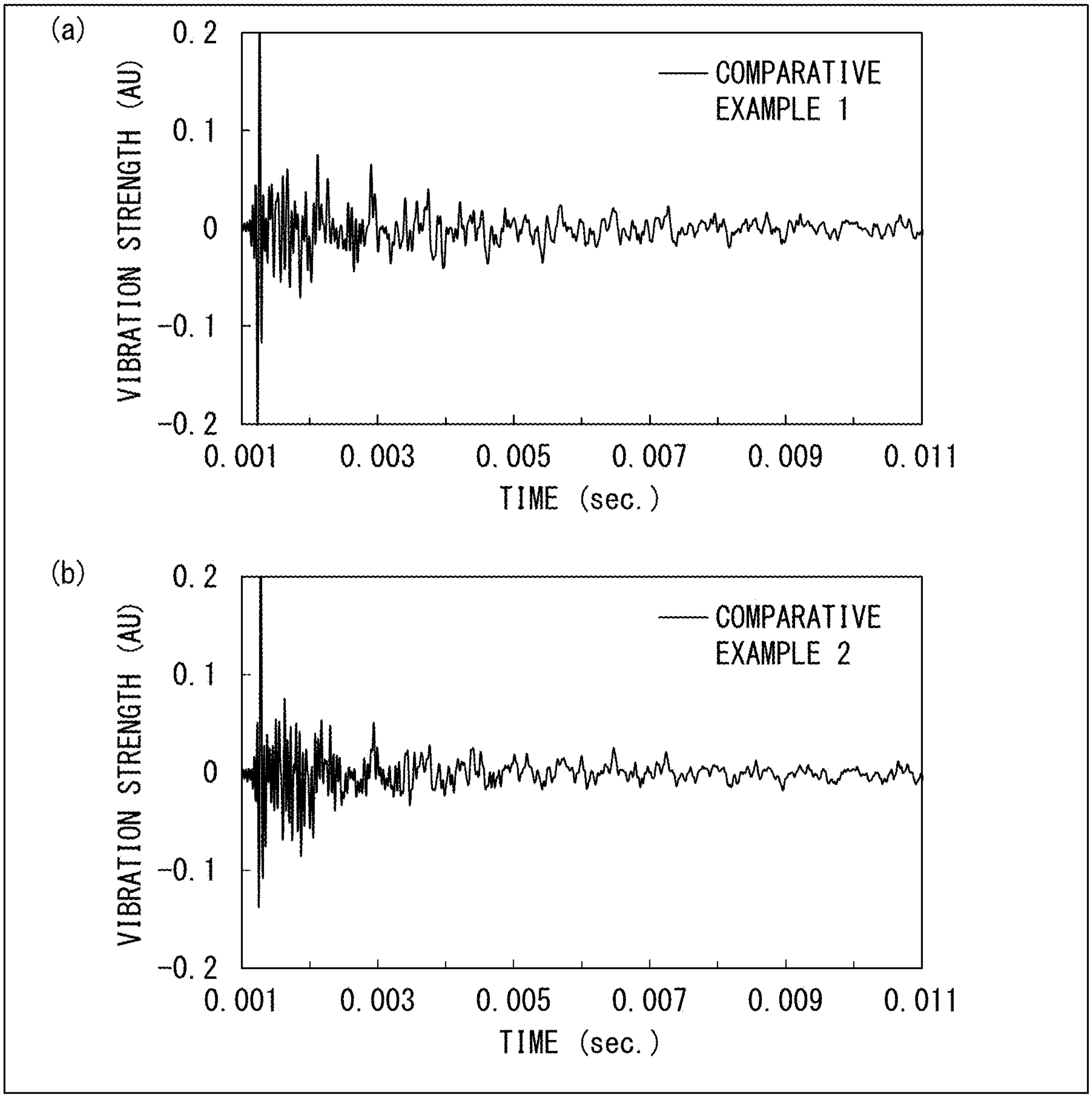

(a) and (b) of FIG. 7 are graphs indicating time dependency of vibration strength obtained by vibration methods in Comparative Example 1 and Comparative Example 2.

Figure 8:
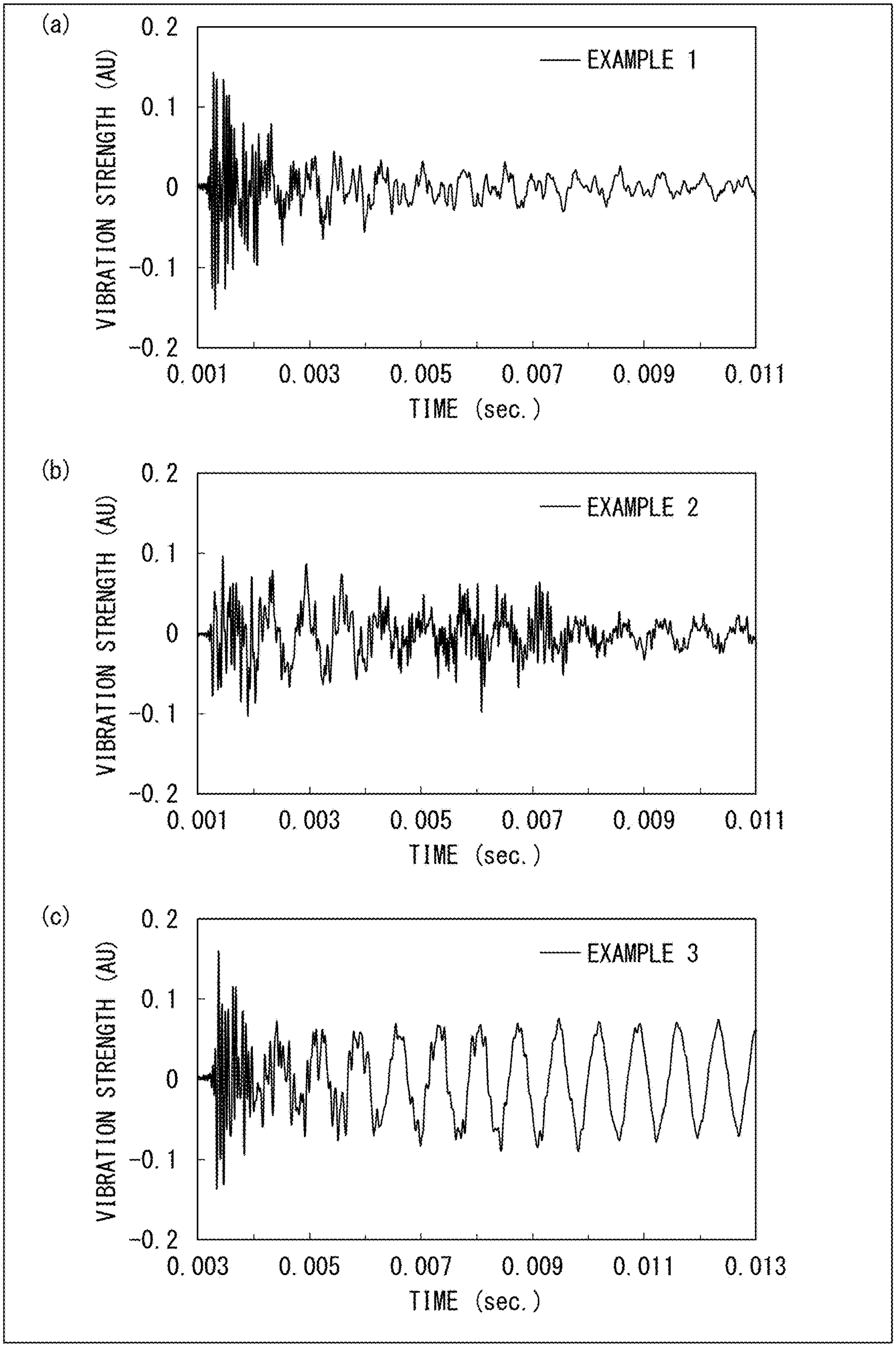

(a) through (c) of FIG. 8 are graphs indicating time dependency of vibration strength obtained by vibration methods in Examples 1 through 3 of the present invention.

Figure 9:
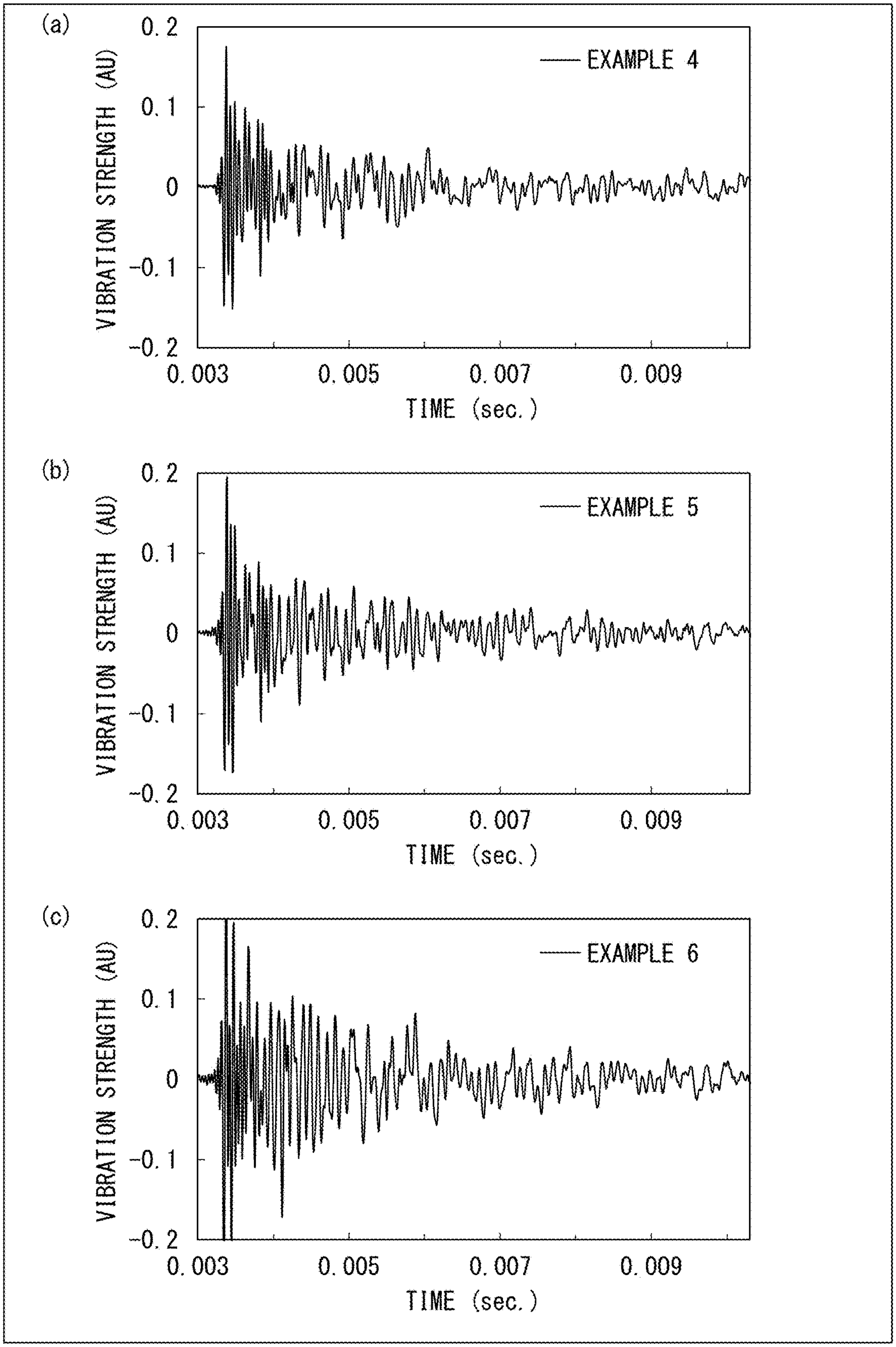

(a) through (c) of FIG. 9 are graphs indicating time dependency of vibration strength obtained by vibration methods in Examples 4 through 6 of the present invention.

Figure 10:
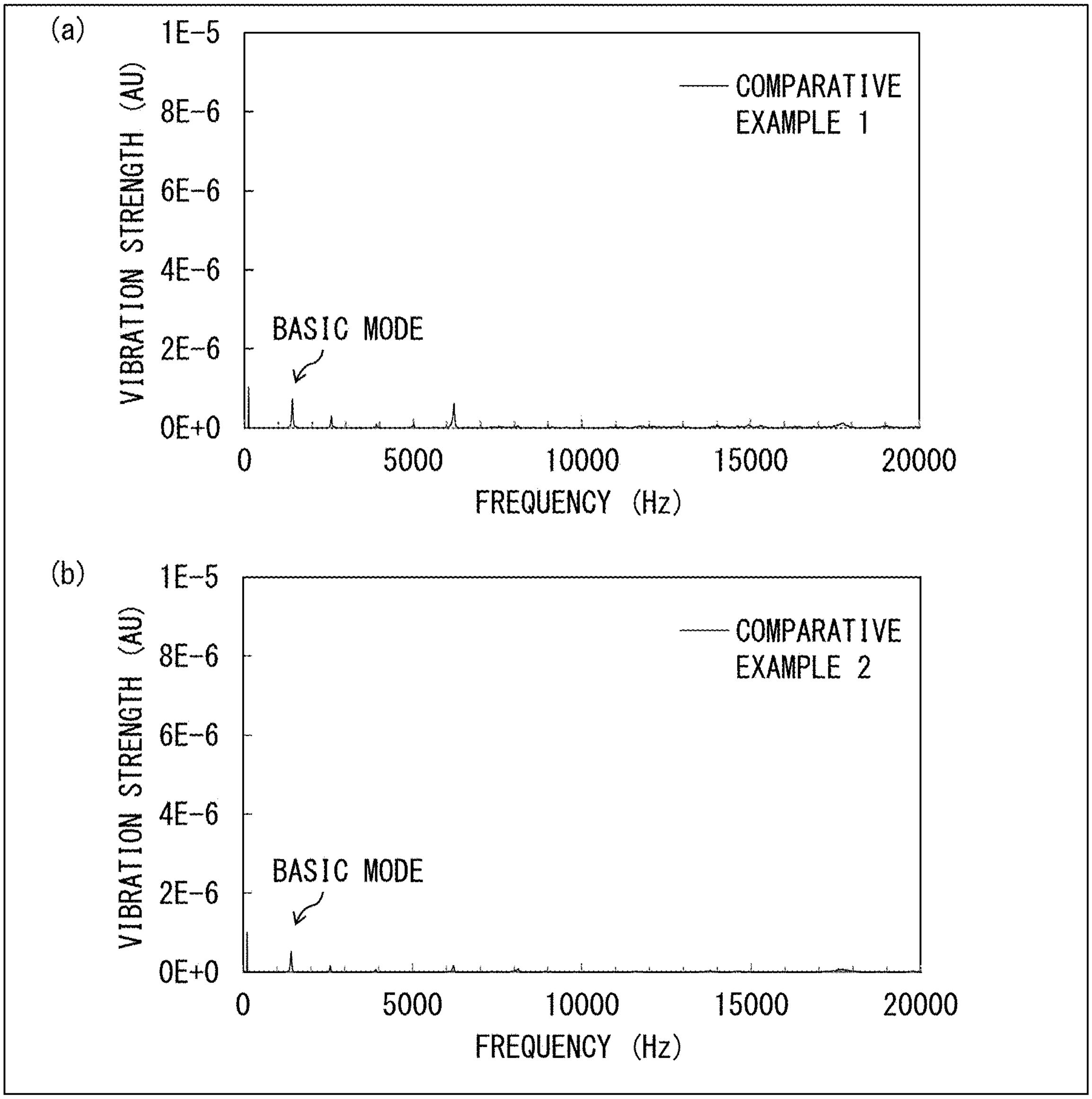

(a) and (b) of FIG. 10 are graphs indicating power spectra of vibration obtained by the vibration methods in Comparative Example 1 and Comparative Example 2.

Figure 11:
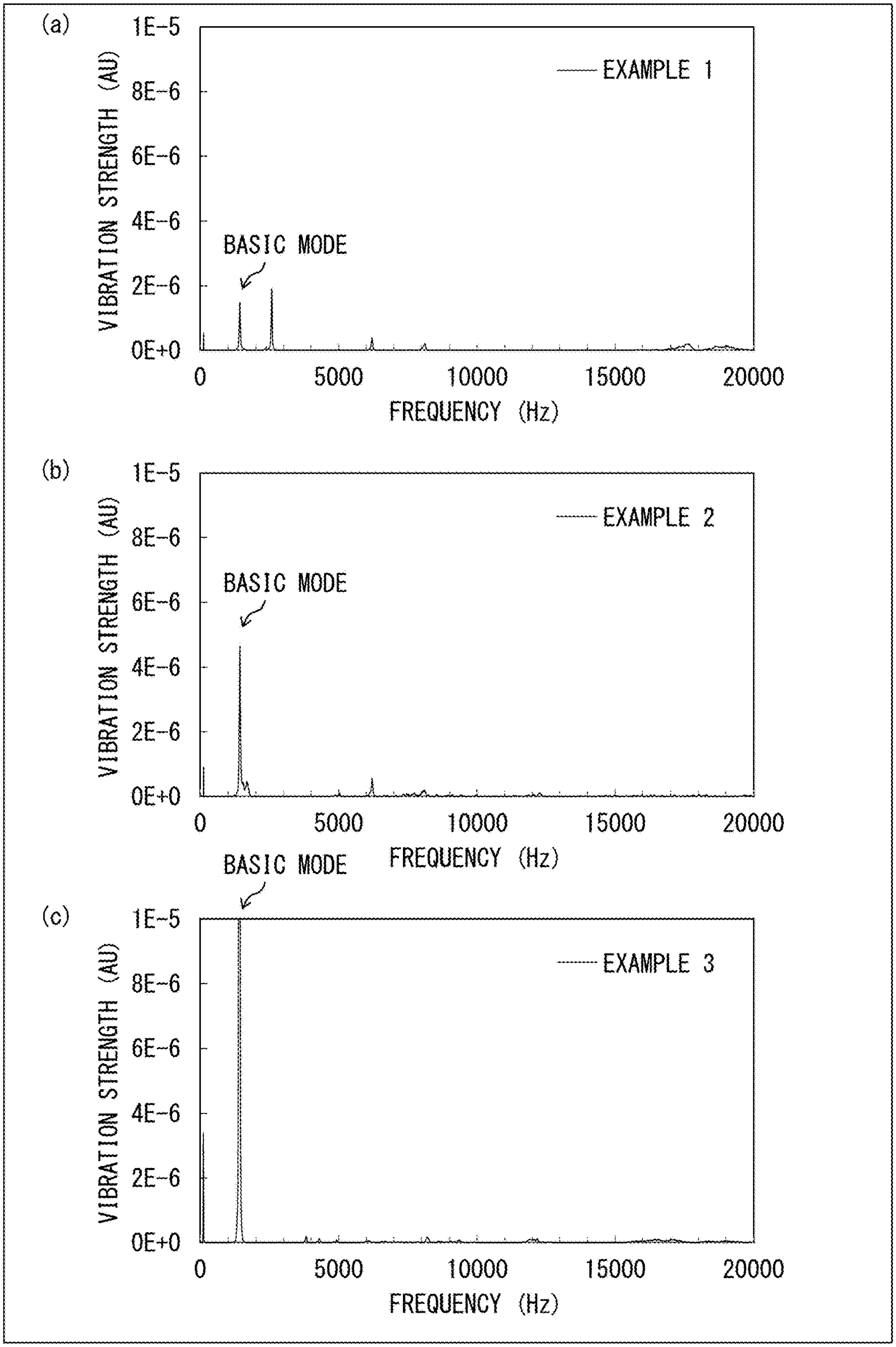

(a) through (c) of FIG. 11 are graphs indicating power spectra of vibration obtained by the vibration methods in Examples 1 through 3 of the present invention.

Figure 12:
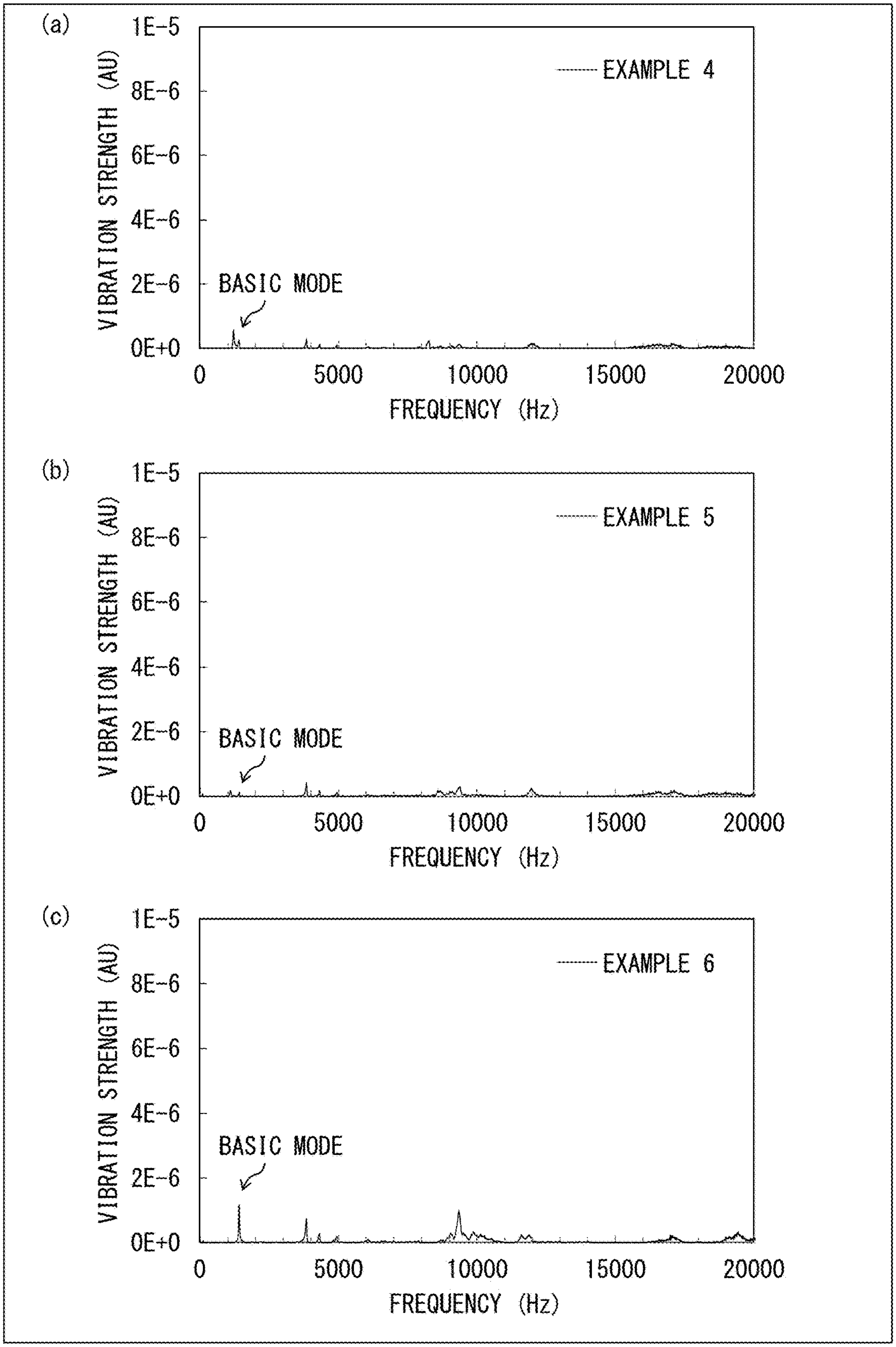

(a) through (c) of FIG. 12 are graphs indicating power spectra of vibration obtained by the vibration methods in Examples 4 through 6 of the present invention.

Figure 13:
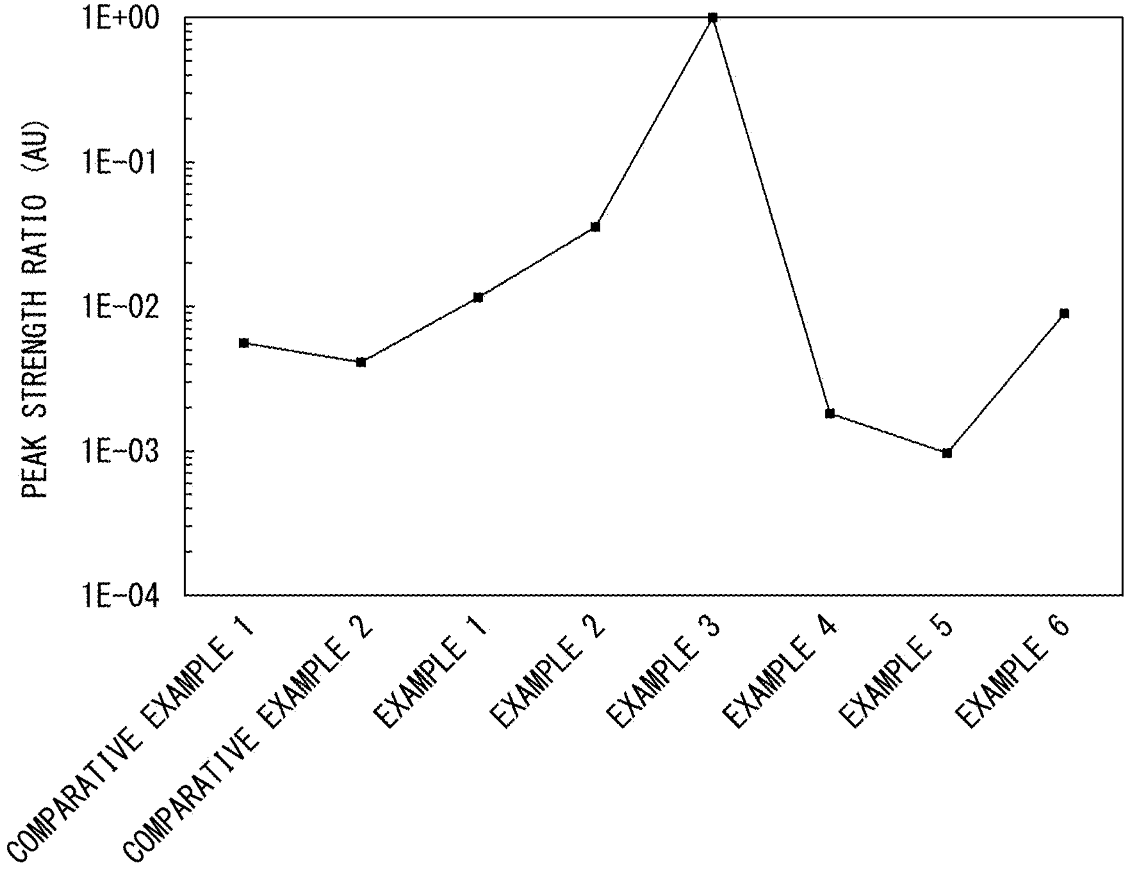

FIG. 13 is a graph indicating a strength ratio of a basic vibration mode in terms of power spectrum of vibration obtained by the vibration methods in Comparative Example 1, Comparative Example 2, and Examples 1 through 6 of the present invention.

Figure 14:
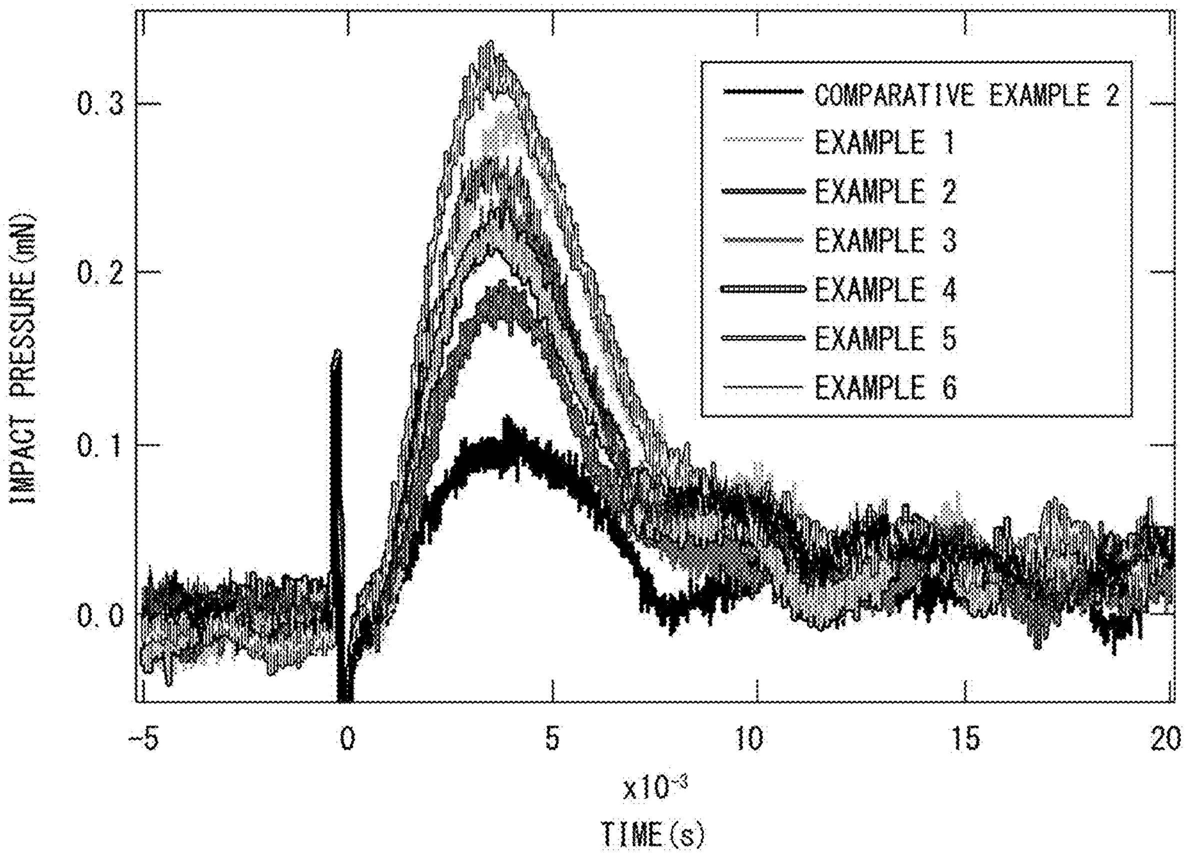

FIG. 14 is a graph indicating time dependency of impact pressure of vibration obtained by the vibration methods in Comparative Example 2 and Examples 1 through 6 of the present invention.

Figure 15:
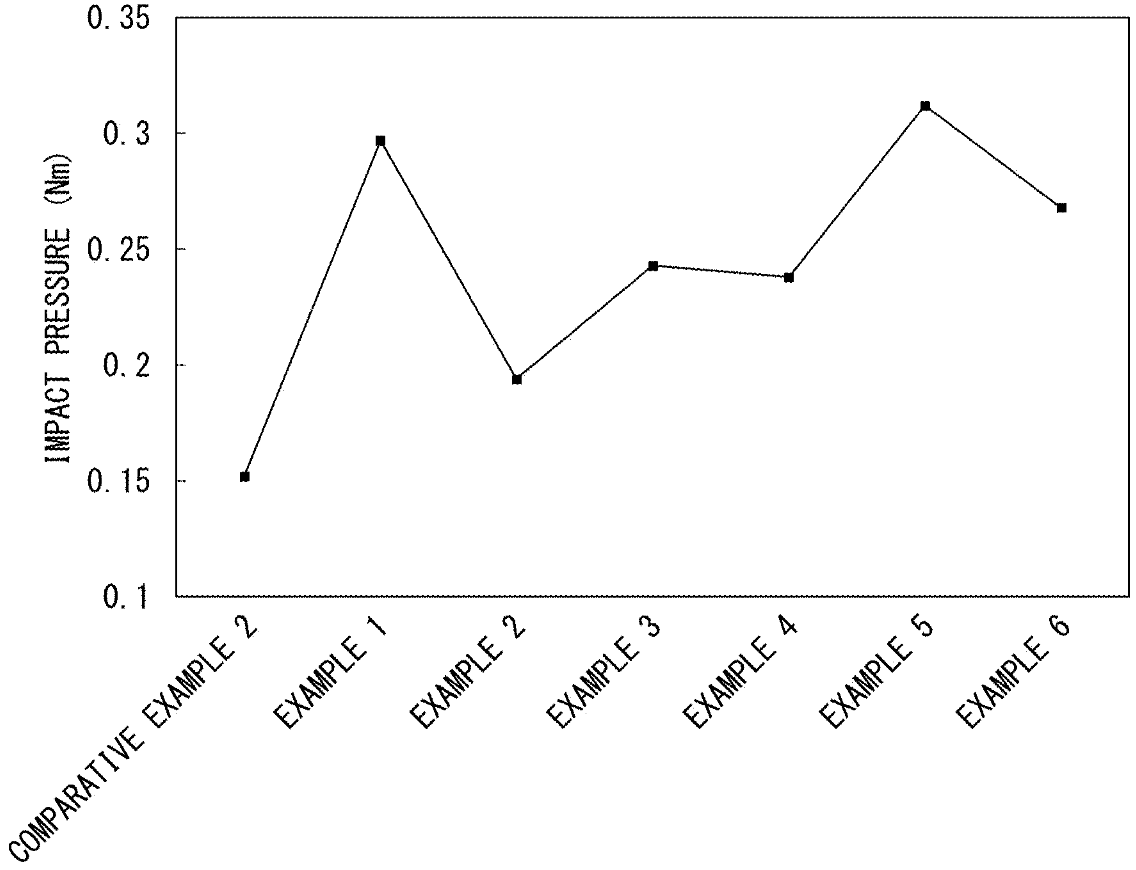

FIG. 15 is a graph indicating peak strengths of impact pressure of vibration obtained by the vibration methods in Comparative Example 2 and Examples 1 through 6 of the present invention.

Figure 16:
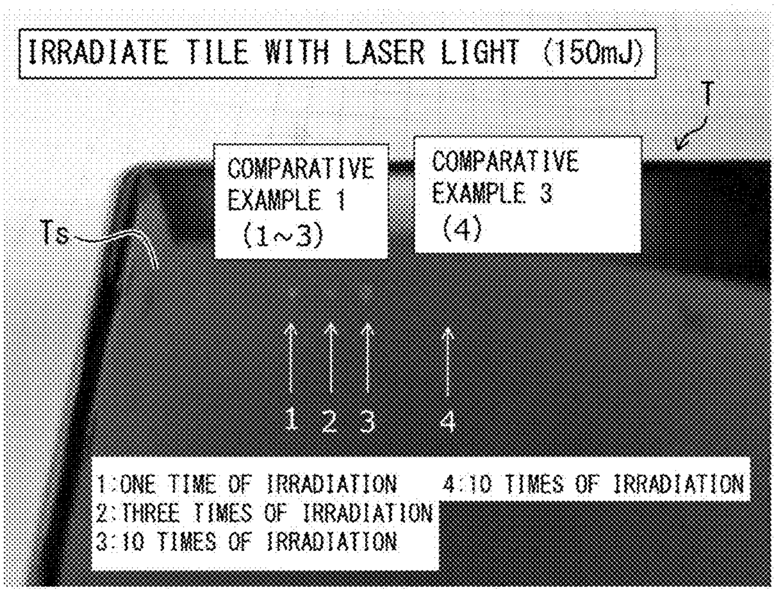

FIG. 16 is an image showing a surface of a tile to which the vibration methods in Comparative Example 1 and Example 3 of the present invention have been applied.

DESCRIPTION OF EMBODIMENTS

Embodiment 1

The following description will discuss a vibration device 10 in accordance with Embodiment 1 of the present invention, with reference to FIGS. 1 and 2. FIG. 1 is a longitudinal sectional view illustrating the vibration device 10. In the present embodiment, the longitudinal section means a cross section that is seen when a shock tube 11 included in the vibration device 10 is cut in an axial direction along a central axis of the shock tube 11. In the present embodiment, a cross section perpendicular to the central axis of the shock tube 11 is referred to as a transverse section. (a) of FIG. 2 is a longitudinal sectional view illustrating the shock tube 11 and a condenser lens 12 which are included in the vibration device 10. (b) of FIG. 2 is a plan view obtained when the condenser lens 12 is seen in plan view. In (b) of FIG. 2, the condenser lens 12 is seen in a direction parallel to the central axis of the shock tube 11.

<Configuration of Vibration Device>

As illustrated in FIG. 1, the vibration device 10 includes: the shock tube 11; the condenser lens 12; a laser light source 13; an introduction tube C13 for laser light, the introduction tube C13 including an optical fiber; a collimating lens 14; and a lens holder 15.

(Shock Tube)

As illustrated in (a) and (b) of FIG. 2, the shock tube 11 includes a lens holder 111, an adapter 112, a main tube 113, and an absorptive treatment layer 114.

The lens holder 111 is a cylindrical member in which an internal space including the central axis is formed to be hollow. In the present embodiment, an inner diameter of the lens holder 111 is 25 mm. Note, however, that the inner diameter of the lens holder 111 can be set as appropriate in accordance with a diameter of the condenser lens 12 (described later).

The adapter 112 is a member for reducing the inner diameter of the lens holder 111 in accordance with an outer diameter of the main tube 113 (described later). The adapter 112 is a discoid member having a circular contour when its main surface is seen in plan view. In a central part of the adapter 112, a circular hole, which is concentric with the contour, is formed. The adapter 112 is provided at one opening (in FIG. 1 and (a) of FIG. 2, an opening on the right) out of openings which are respectively formed on a pair of bottom planes of the lens holder 111. The adapter 112 functions as a connection member for connecting the main tube 113 to the lens holder 111.

An outer diameter of the adapter 112 corresponds to an inner diameter of the lens holder 111, and is 25 mm in the present embodiment. Therefore, an outer surface of the adapter 112 fits into an inner surface of the lens holder 111. Although not illustrated in FIGS. 1 and 2, a female screw is formed in the lens holder 111 and a male screw is formed in the adapter 112 at a part where the lens holder 111 and the adapter 112 fit together. According to this configuration, the adapter 112 and the main tube 113 can be replaced if needed.

An inner diameter of the adapter 112 is 13 mm in the present embodiment. Note, however, that the inner diameter of the adapter 112 can be set as appropriate in accordance with the outer diameter of the main tube 113.

The main tube 113 is a cylindrical member in which an internal space including the central axis is formed to be hollow. In the present embodiment, the outer diameter and an inner diameter φ of the main tube 113 are 13 mm and 11 mm, respectively. That is, a thickness of a side wall of the main tube 113 is 1 mm.

Therefore, the outer surface of the main tube 113 fits into the inner surface of the adapter 112. Although not illustrated in FIGS. 1 and 2, a female screw is formed in the adapter 112 and a male screw is formed in the main tube 113 at a part where the adapter 112 and the main tube 113 fit together. According to this configuration, the adapter 112 and the main tube 113 can be replaced if needed. Therefore, the inner diameter φ of the main tube 113 can be changed as appropriate.

The inner diameter φ of the main tube 113 is not limited to 11 mm, and can be set as appropriate. In working examples of the present invention described later, inner diameters φ of the main tube 113 are 25 mm, 15 mm, 9 mm, 8 mm, and 6 mm, in addition to 11 mm. In the case where the inner diameter φ of the main tube 113 is 25 mm, the adapter 112 may be omitted, and the main tube 113 may be directly connected to the lens holder 111. In the present embodiment, the main tube 113 having a uniform inner diameter φ is employed. Note, however, that the inner diameter φ of the main tube 113 may not be uniform. For example, the inner diameter φ of the main tube 113 may be enlarged as a distance increases from the end part of the main tube 113 at the condenser lens 12 side. Specific examples of this case include a configuration example in which the inner wall surface of the main tube 113 is tapered with a linear slope, and a configuration example in which a slope of the inner wall surface of the main tube 113 is formed in a curved surface, and at least an inner diameter part (inner wall part) of the main tube 113 spreads in a trumpet shape.

In the present embodiment, each of the lens holder 111, the adapter 112, and the main tube 113 is made of an aluminum alloy. Note, however, that a material constituting each of the lens holder 111, the adapter 112, and the main tube 113 may be a metal (e.g., stainless steel or copper) other than the aluminum alloy, may be a resin, or may be ceramics.

An inner wall 1131 of the main tube 113 is constituted by a smooth curved surface with no step. Therefore, in the present embodiment, in an internal space 11*a*, at least an inner wall of a second section S2 extending from a condensing point Pf to an end part 11*a*2 is constituted by a smooth curved surface with no step (see (a) of FIG. 2). In the present embodiment, the end part of the main tube 113 at the condenser lens 12 side is apart from an exit plane of the condenser lens 12. Thus, discontinuity occurs in the diameter of the internal space 11*a* in the middle of a first section S1. Note, however, that the end part of the main tube 113 at the condenser lens 12 side may be configured to make contact with the exit plane of the condenser lens 12. In this case, the diameter of the internal space 11*a* is equal to the inner diameter φ also in the first section S1. Therefore, according to this configuration, the inner wall surrounding the internal space 11*a* can be configured with a smooth curved surface throughout a whole section Sa. Note that the condensing point Pf, the first section S1, the second section S2, and the whole section Sa will be described later in the section of the condenser lens.

In the present embodiment, the light absorptive treatment layer 114 such as a black anodized aluminum layer formed by applying an anodized aluminum treatment is provided on an inner wall 1131 of the main tube 113 (see (a) of FIG. 2). The absorptive treatment layer 114 is an example of the absorption section. A section forming the absorptive treatment layer 114 in the side wall surrounding the internal space 11*a* is preferably at least the second section S2 which extends from the condensing point Pf to the end part 11*a*2, more preferably a whole section of the main tube 113. It is further preferable that a light absorptive treatment layer such as a black anodized aluminum layer is formed also on an inner wall of the lens holder 111, in addition to the inner wall 1131 of the main tube 113.

As described above, the shock tube 11 includes the lens holder 111 and the main tube 113 which are connected to each other via the adapter 112. Therefore, the internal space 11*a* of the shock tube 11 can be divided into two sections, i.e., a section which has a relatively larger inner diameter and is surrounded laterally by the lens holder 111, and a section which has a relatively smaller inner diameter and is surrounded laterally by the main tube 113.

An end part 11*a*1, which is a first end of a pair of end parts of the internal space 11*a*, is sealed by the condenser lens 12 (described later). An end part 11*a*2, which is a second end of the pair of end parts of the internal space 11*a*, is opened because the end part of the main tube 113 is left open.

In the present embodiment, the shock tube 11 is configured by assembling the lens holder 111, the adapter 112, and the main tube 113, which are separate members. Note, however, that, in the shock tube 11, (i) the lens holder 111, the adapter 112, and the main tube 113 may be constituted by a single member that is integrally molded, (ii) the lens holder 111 and the adapter 112 may be constituted by a single member that is integrally molded, or (iii) the adapter 112 and the main tube 113 may be constituted by a single member that is integrally molded.

(Condenser Lens)

As illustrated in FIG. 1 and (a) of FIG. 2, the condenser lens 12 condenses entered collimated light at a focal point by converting the entered collimated light into convergent light. In the present embodiment, a planoconvex aspheric lens having a focal length FL of 20 mm is used as the condenser lens 12. An outer diameter of the condenser lens 12 is 25 mm, which corresponds to the inner diameter of the lens holder 111.

The condenser lens 12 is fixed to the inner wall of the lens holder 111 in a state of sealing the end part 11*a*1, which is a first end of the internal space 11*a* of the shock tube 11. Note that a method of fixing the condenser lens 12 to the inner wall of the lens holder 111 is not limited, and can be selected as appropriate.

Note that an optical axis of the condenser lens 12 preferably substantially conforms to the central axis of the shock tube 11, more preferably conforms to the central axis of the shock tube 11. In the present embodiment, the optical axis of the condenser lens 12 and the central axis of the shock tube 11 conform to each other.

In the shock tube 11 and the condenser lens 12 which are configured as described above, in a case where laser light L (see FIG. 1) has entered an incidence plane which is positioned opposite to the internal space 11*a*, the condenser lens 12 condenses the laser light L in the internal space 11*a*. In the present embodiment, a configuration is employed in which collimated laser light L is emitted toward the incidence plane of the condenser lens 12. Therefore, the condensing point Pf at which the laser light L is condensed conforms to the focal point of the condenser lens 12.

In the present embodiment, a position of the condenser lens 12 in the lens holder 111 is determined such that the condensing point Pf is positioned in a section surrounded laterally by the main tube 113 in the internal space 11*a* (see (a) of FIG. 2). In the following descriptions, in the internal space 11*a*, a section extending from the first end 11*al* to the condensing point Pf is referred to as a first section S1, a section extending from the condensing point Pf to the second end 11*a*2 is referred to as a second section S2, and a section extending from the end part 11*al* to the end part 11*a*2 is referred to as a whole section Sa.

(Laser Light Source)

The laser light source 13 emits pulsed laser light L. That is, the laser light source 13 is a pulse laser. In the present embodiment, as the laser light source 13, a microchip pulse laser light source in which yttrium-aluminum-garnet (YAG) is used as laser crystal is used. The laser light source 13 lases by realizing population inversion using excitation light that is supplied to laser crystal using the optical fiber provided in the introduction tube C13. As a result, the laser light source 13 emits pulsed laser light L having a wavelength of 1064 nm. Note, however, that the wavelength of the laser light L emitted by the laser light source 13 is not limited to 1064 nm, and can be selected as appropriate. That is, the laser light source 13 is not limited to the YAG laser. Note that, in FIG. 1, an internal structure of the laser light source 13 is not illustrated.

In a case where an intended power of laser light L is obtained by a microchip laser light source, the vibration device 10 can be reduced in size by employing the microchip laser light source as the laser light source. Meanwhile, in a case where the intended power of laser light L cannot be obtained by a microchip laser light source, a stationary laser light source may be employed as the laser light source. A case where a stationary laser light source is employed will be described later with reference to FIG. 3. In Examples 1 through 6 and Comparative Examples 1 and 2 which will be described later, a stationary laser light source is employed as the laser light source. Currently, a power of laser light obtained by a microchip laser light source falls within, for example, a range of 10 mJ or more and 20 mJ or less. Note, however, that the power of the laser light obtained by the pulse laser light source is not limited to this. In a case where the pulse laser light source is not limited to a microchip laser light source, and a stationary pulse laser light source is also included, a power of obtained laser light can be selected as appropriate, for example, within a range of 5 mJ or more and 200 mJ or less.

(Lens Holder)

As illustrated in FIG. 1, the lens holder 15 is a cylindrical member in which an internal space including the central axis is formed to be hollow. In the present embodiment, an inner diameter of the lens holder 15 is 25 mm. Note, however, that the inner diameter of the lens holder 15 can be set as appropriate in accordance with a diameter of the collimating lens 14 (described later).

The lens holder 15 is fixed to the laser light source 13. The central axis of the lens holder 15 preferably substantially conforms to the optical axis of the laser light source 13, more preferably conforms to the optical axis of the laser light source 13. In the present embodiment, the central axis of the lens holder 15 and the optical axis of the laser light source 13 conform to each other.

The lens holder 15 is fixed to the laser light source 13 with a plurality of bolts (not illustrated in FIG. 1). Note, however, that a means for fixing the lens holder 15 to the laser light source 13 is not limited, and can be set as appropriate.

Out of the pair of end parts of the lens holder 15, an end part opposite to the laser light source 13 is connected to an end part of the shock tube 11 which is at the condenser lens 12 side out of the pair of end parts of the shock tube 11. In the present embodiment, the end part of the shock tube 11 at the condenser lens 12 side is fitted into the opening provided at the end part of the lens holder 15 opposite to the laser light source 13. Thus, the shock tube 11 is connected to the lens holder 15. Note, however, that a means for fixing the shock tube 11 to the lens holder 15 is not limited, and can be set as appropriate.

The central axis of the shock tube 11 preferably substantially conforms to the central axis of the lens holder 15, more preferably conforms to the central axis of the lens holder 15. In the present embodiment, the central axis of the lens holder 15 and the central axis of the shock tube 11 conform to each other.

In the present embodiment, the lens holder 15 is made of an aluminum alloy. Note, however, that a material constituting the lens holder 15 may be a metal (e.g., stainless steel or copper) other than the aluminum alloy, may be a resin, or may be ceramics.

(Collimating Lens)

As illustrated in FIG. 1, the collimating lens 14 is a lens that converts diffused light which has been emitted from the laser light source 13 and has entered the collimating lens 14 into collimated light. The collimating lens 14 is an example of an optical system for coupling laser light L to the condenser lens 12. In the present embodiment, a planoconvex aspheric lens having a focal length FL of 20 mm is used as the collimating lens 14. The collimating lens 14 is configured in a manner similar to the condenser lens 12.

An outer diameter of the collimating lens 14 is 25 mm, which corresponds to the inner diameter of the lens holder 15. The collimating lens 14 is fixed to the inner wall of the lens holder 15. Note that a method of fixing the collimating lens 14 to the inner wall of the lens holder 15 is not limited, and can be selected as appropriate.

Note that the optical axis of the collimating lens 14 preferably substantially conforms to the central axis of the lens holder 15, more preferably conforms to the central axis of the lens holder 15. In the present embodiment, the optical axis of the collimating lens 14 and the central axis of the lens holder 15 conform to each other. Therefore, in the present embodiment, the optical axis of the laser light source 13 and the optical axis of the collimating lens 14 conform to each other.

<Variation>

A vibration device 20, which is a variation of the vibration device 10, will be described with reference to FIG. 3. FIG. 3 is a longitudinal sectional view illustrating the vibration device 20.

The vibration device 20 includes a shock tube 21, a condenser lens 22, a laser light source 23, a collimating lens 24, a lens holder 25, an optical fiber 26, a block 27, and an adapter 28. The shock tube 21, the condenser lens 22, the laser light source 23, the collimating lens 24, and the lens holder 25 correspond to the shock tube 11, the condenser lens 12, the laser light source 13, the collimating lens 14, and the lens holder 15, respectively. The optical fiber 26 and the block 27 are members employed in accordance with the fact that the laser light source 23 is employed as the laser light source. The adapter 28 is a member employed in accordance with the fact that the shock tube 21 is employed as the shock tube.

(Shock Tube and Condenser Lens)

As illustrated in FIG. 3, the shock tube 21 is a cylindrical member in which an internal space including the central axis is formed to be hollow. In this variation, an outer diameter and an inner diameter of the shock tube 21 are 13 mm and 11 mm, respectively. That is, a thickness of a side wall of the shock tube 21 is 1 mm. Note, however, that the inner diameter of the shock tube 21 is not limited to 11 mm, and can be set as appropriate, as with the inner diameter φ of the main tube 113. Further, in this variation, the shock tube 21 having a uniform inner diameter φ is employed. Note, however, that the inner diameter φ of the shock tube 21 may not be uniform. For example, the inner diameter φ of the shock tube 21 may be enlarged as a distance increases from an end part 21*al* of the shock tube 21 at the condenser lens 22 side. That is, an inner diameter part of the shock tube 21 may be configured to be in a tapered shape or trumpet shape, as early described.

In this variation, the shock tube 21 is made of an aluminum alloy. Note, however, that a material constituting the shock tube 21 may be a metal (e.g., stainless steel or copper) other than the aluminum alloy, may be a resin, or may be ceramics.

As illustrated in FIG. 3, the condenser lens 22 condenses entered collimated light at a focal point by converting the entered collimated light into convergent light. In this variation, a planoconvex aspheric lens having a focal length FL of 20 mm is used as the condenser lens 22. An outer diameter of the condenser lens 22 is 11 mm, which corresponds to the inner diameter of the shock tube 21.

The condenser lens 22 is fixed to an inner wall 21*d* of the shock tube 21 in a state of sealing the end part 21*al*, which is a first end of the internal space 21*a* of the shock tube 21. Note that a method of fixing the condenser lens 22 to the inner wall 21*d* is not limited, and can be selected as appropriate.

As described above, the end part 21*al*, which is a first end of the pair of end parts of the internal space 21*a*, is sealed by the condenser lens 22. An end part 21*a*2, which is a second end of the pair of end parts of the internal space 21*a*, is opened because the end part of the shock tube 21 is left open.

Note that an optical axis of the condenser lens 22 preferably substantially conforms to the central axis of the shock tube 21, more preferably conforms to the central axis of the shock tube 21. In this variation, the optical axis of the condenser lens 22 and the central axis of the shock tube 21 conform to each other.

The inner wall 21*d* of the shock tube 21 is constituted by a smooth curved surface with no step throughout the whole section (see FIG. 3). Therefore, in this variation, in the internal space 21*a*, at least an inner wall of a second section S2 extending from the condensing point Pf to the end part 21*a*2 is constituted by a smooth curved surface with no step.

In this variation, a light absorptive treatment layer 214 such as a black anodized aluminum layer formed by applying an anodized aluminum treatment is provided on the inner wall 21*d* of the shock tube 21 (see FIG. 3). The absorptive treatment layer 214 is an example of the absorption section. A section forming the absorptive treatment layer 214 in the inner wall 21*d* is preferably at least the second section extending from the condensing point Pf to the end part 21*a*2, more preferably a whole section of the shock tube 21.

The adapter 28 is a member for reducing the inner diameter of the lens holder 25 in accordance with the outer diameter of the shock tube 21, and is configured in a manner similar to the adapter 112. The adapter 28 is provided at one opening (in FIG. 3, an opening on the right) out of openings which are respectively formed on a pair of bottom planes of the lens holder 25. The adapter 28 functions as a connection member for connecting the shock tube 21 to the lens holder 25. According to this configuration, the adapter 28 and the shock tube 21 can be replaced if needed.

An inner diameter of the adapter 112 is 13 mm in the present embodiment. Note, however, that the inner diameter of the adapter 112 can be set as appropriate in accordance with the outer diameter of the main tube 113.

As described above, an end part of the pair of end parts of the lens holder 25 opposite to the optical fiber 26 and the block 27 is connected to an end part of the pair of end parts of the shock tube 21 at the condenser lens 22 side via the adapter 28.

(Laser Light Source)

The vibration device 20 employs the laser light source 23 having a higher output than the laser light source 13, which is a microchip laser light source. Note that the laser light source 23 is a pulse laser, as with the laser light source 13. Laser crystal of the laser light source 23 is YAG, as with the laser light source 13. The laser light source 23 can emit laser light L having a higher power (e.g., 1 J) than the laser light source 13. Note, however, that the power of the laser light obtained by the laser light source 23 is not limited to 1 J, and can be selected as appropriate within, for example, a range of 50 mJ or more and 10 J or less. As in the case of the laser light source 13, a wavelength of laser light L emitted by the laser light source 23 is not limited to 1064 nm, and can be selected as appropriate. That is, the laser light source 23 is not limited to the YAG laser.

(Optical Fiber and Block)

A first end of the optical fiber 26 is connected to an exit port of the laser light source 23, and a second end of the optical fiber 26 is fixed by the block 27. The optical fiber 26 guides the laser light L to emit the laser light L toward the collimating lens 24. Which one of a single mode fiber and a multimode fiber is employed as the optical fiber 26 may be determined in accordance with the power of the laser light L.

The block 27 is a columnar mass of metal. In the block 27, a through hole penetrating from one bottom plane to the other bottom plane is formed (see FIG. 3). The second end of the optical fiber 26 is fixed in a state of being passed through the through hole in the block 27.

(Collimating Lens and Lens Holder)

The lens holder 25 is configured in a manner similar to the lens holder 15. That is, the lens holder 25 is a cylindrical member in which an internal space including the central axis is formed to be hollow, and the collimating lens 24 is fixed to an inner wall of the lens holder 25. The collimating lens 24 is configured in a manner similar to the collimating lens 14. Note, however, that the lens holder 25 is different from the lens holder 15, which is fixed to the laser light source 13, in that the lens holder 25 is fixed to the block 27.

The central axis of the lens holder 25 preferably substantially conforms to the optical axis of the optical fiber 26 fixed to the block 27, more preferably conforms to the optical axis of the optical fiber 26. In the present embodiment, the central axis of the lens holder 25 and the optical axis of the optical fiber 26 which is fixed to the block 27 conform to each other.

Further, the optical axis of the collimating lens 24 preferably substantially conforms to the central axis of the lens holder 25, more preferably conforms to the central axis of the lens holder 25. In the present embodiment, the optical axis of the collimating lens 24 and the central axis of the lens holder 25 conform to each other.

The collimating lens 24 converts laser light L emitted from the optical fiber 26 from diffused light into collimated light, and couples the laser light L which is collimated light to the condenser lens 22 (described later). As such, the optical fiber 26 and the collimating lens 24 are an example of an optical system that couples laser light L to the condenser lens 22.

In this variation, the shock tube 21 is connected, via the adapter 28, to an opening provided at an end part of the lens holder 25 opposite to the block 27.

The central axis of the shock tube 21 preferably substantially conforms to the central axis of the lens holder 25, more preferably conforms to the central axis of the lens holder 25. In this variation, the central axis of the lens holder 25 and the central axis of the shock tube 21 conform to each other.

In this variation, the lens holder 15 is made of an aluminum alloy. Note, however, that a material constituting the lens holder 15 may be a metal (e.g., stainless steel or copper) other than the aluminum alloy, may be a resin, or may be ceramics.

(Combination of Laser Light Source and Shock Tube)

In the vibration device 10 illustrated in FIG. 1, the laser light source 13 and the shock tube 11 are connected to each other via the lens holder 15. Meanwhile, in the vibration device 20 illustrated in FIG. 3, the laser light source 23, the optical fiber 26, and the block 27 are connected to the shock tube 21 via the lens holder 25 and the adapter 28. In one aspect of the present invention, a combination of a laser light source and a shock tube is freely selectable. Specifically, the laser light source 13 and the shock tube 21 may be connected to each other via the lens holder 25 and the adapter 28. Alternatively, the laser light source 23, the optical fiber 26, and the block 27 can be connected to the shock tube 11 via the lens holder 15.

<Vibration Method>

The following description will discuss a vibration method M10 for outputting a laser induced plasma (LIP) shock wave Wi with use of the vibration device 10, with reference to FIGS. 1 and 4. FIG. 4 is a flowchart illustrating the vibration method M10. The vibration method M10 is an aspect of the present invention, as with the vibration device 10. The vibration method M10 includes, as illustrated in FIG. 4, a first step S11, a second step S12, and a third step S13.

As illustrated in FIG. 1, the laser light source 13 emits laser light L which is diffused light. In the present embodiment, a wavelength of the laser light L is 1064 nm, and a power of the laser light L is, for example, 150 mJ.

The collimating lens 14 converts the laser light L which is diffused light into laser light L which is collimated light, and then emits the laser light L toward the condenser lens 12. Thus, the first step S11 is a step of emitting the laser light L toward the condenser lens 12.

The condenser lens 12 converts the laser light L which is entered collimated light into convergent light, and thus condenses the laser light L at the condensing point Pf which is positioned in the internal space 11*a*. Condensation of the laser light L causes LIP at the condensing point Pf. This LIP propagates at high speed to the surroundings as a shock wave. In the following description, this shock wave is referred to as an LIP shock wave Wi. Thus, the second step S12 is a step of generating the LIP shock wave Wi by condensing the laser light L in the internal space 11*a*.

The condensing point Pf is positioned inside the internal space 11*a*. Therefore, the LIP shock wave Wi generated at the condensing point Pf propagates along the central axis of the shock tube 11 toward the end part 11*a*2 at the opened side. As a result, the vibration device 10 outputs the LIP shock wave Wi from the end part 11*a*2 of the internal space 11*a*. As such, the third step S13 is a step of outputting the LIP shock wave Wi from the end part 11*a*2. Thus, the shock tube 11 outputs the LIP shock wave Wi from the end part 11*a*2.

By directing the end part 11*a*2 toward a surface Ts of a target T as illustrated in FIG. 5, it is possible to apply the LIP shock wave Wi to the surface Ts. Therefore, the vibration device 10 can vibrate the surface Ts using the LIP shock wave Wi.

In the present embodiment, the vibration method M10 has been described with use of the vibration device 10. Note, however, that it is also possible to carry out the vibration method M10 using the vibration device 20 illustrated in FIG. 3. In such a case, the first step S11 is a step of emitting laser light L toward the condenser lens 22, the second step S12 is a step of generating an LIP shock wave Wi by condensing the laser light L in the internal space 21*a*, and the third step S13 is a step of outputting the LIP shock wave Wi from the end part 21*a*2 of the internal space 21*a*.

<Main Points of Vibration Device and Vibration Method>

As described above, the vibration device (10, 20) includes the condenser lens (12, 22) and the shock tube (11, 21). In the shock tube (11, 21), the first end (11*a*1, 21*a*1) of the internal space (11*a*, 21*a*) is sealed by the condenser lens (12, 22), and the second end (11*a*2, 21*a*2) of the internal space (11*a*, 21*a*) is opened. Laser light L is supplied to the shock tube (11, 21) via the condenser lens (12, 22). The shock tube (11, 21) outputs an LIP shock wave Wi from the second end (11*a*2, 21*a*2). In such a vibration device (10, 20), the condenser lens (12, 22) is configured to condense the laser light L in the internal space (11*a*, 21*a*) of the shock tube (11, 21).

The vibration method M10 is a vibration method that generates an LIP shock wave Wi using the shock tube (11, 21), and includes: the first step S11 of emitting laser light L toward the condenser lens (12, 22); the second step S12 of generating an LIP shock wave Wi by condensing the laser light L in the internal space (11*a*, 21*a*); and the third step S13 of outputting the LIP shock wave Wi from the second end (11*a*1, 21*a*1).

In the vibration device (10, 20) and the vibration method M10, the shock tube (11, 21) propagates, while guiding, the LIP shock wave Wi generated at the condensing point Pf to the end part (11*a*2, 21*a*2), and outputs the LIP shock wave Wi from the end part (11*a*2, 21*a*2). Therefore, in the vibration device (10, 20), by directing the end part (11*a*2, 21*a*2) toward the surface Ts of the target T, LIP shock waves Wi in the same propagation direction can be applied to the surface Ts. As a result, in a technique to vibrate a target T using LIP shock waves Wi, the vibration device (10, 20) and the vibration method M10 can enhance efficiency of vibrating the target T, as compared with the technique described in Patent Literature 1.

In a technique using an acoustic lens described in Proceedings of Dynamics and Design Conference 2020 [No. 20-11], 2020.9.1-4. by Naoki Hosoya, Yuki Yoshida, Shingo Maeda, Itsuro Kajiwara, it is necessary that the following two requirements are satisfied in order to obtain a predetermined vibration strength. The first requirement is to adjust an optical system so that laser light L is condensed at one of two focal points of the acoustic lens. The second requirement is to arrange the acoustic lens so that the other focal point of the two focal points of the acoustic lens conforms to a surface Ts.

In the vibration device (10, 20) and the vibration method M10, the LIP shock wave Wi guided by the shock tube (11, 21) is output along the central axis of the shock tube (11, 21). That is, the LIP shock wave Wi is output in a state of having directivity. Therefore, the vibration strength obtained in the vibration device (10, 20) and the vibration method M10 hardly depends on the position of the condensing point Pf in the internal space (11*a*, 21*a*), and hardly depends on the distance between the end part (11*a*2, 21*a*2) and the surface Ts.

The vibration device (10, 20) preferably further includes: the laser light source (13, 23) that emits laser light L; and the optical system that couples the laser light L to the condenser lens (12, 22). The optical system is the collimating lens 14 in the vibration device 10, and is the collimating lens 24 and the optical fiber 26 in the vibration device 20.

According to this configuration, the laser light L can be reliably condensed at the condensing point Pf in the internal space (11*a*, 21*a*).

In the vibration device (10, 20), the configuration is employed in which, in the internal space (11*a*, 21*a*), at least an inner wall of the second section S2 extending from the condensing point Pf to the end part (11*a*2, 21*a*2) is constituted by a smooth curved surface with no step.

According to this configuration, there is no structural discontinuity in the second section S2. Therefore, it is possible to reduce a loss that may occur in the LIP shock wave Wi.

In the vibration device (10, 20), the configuration is employed in which, in the internal space (11*a*, 21*a*), at least an inner wall of the second section S2 extending from the condensing point Pf to the end part (11*a*2, 21*a*2) is provided with an absorption section (in the present embodiment, the absorptive treatment layer (114, 214)) that absorbs laser light L.

According to this configuration, the absorption section absorbs the laser light after the LIP shock wave Wi is generated at the condensing point Pf. Therefore, it is possible to reduce laser light that leaks to the outside of the shock tube (11, 21).

Embodiment 2

The following description will discuss an inspection system S in accordance with Embodiment 2 of the present invention, with reference to FIG. 5. FIG. 5 is a block diagram illustrating the inspection system S.

As illustrated in FIG. 5, the inspection system S includes a vibration device 10, a control section 30, and a laser Doppler vibrometer 40.

An optical fiber is provided in an introduction tube C13 to supply excitation light from an excitation light source E13 to the vibration device 10. Note that the excitation light source E13 is controlled based on a control signal which is generated by the control section 30. A cable C40 is provided to connect the control section 30 to the laser Doppler vibrometer 40. The cable C40 transmits, to the laser Doppler vibrometer 40, a control signal which is generated by the control section 30 to control the laser Doppler vibrometer 40. Moreover, the cable C40 transmits, to the control section 30, a vibration signal that indicates vibration measured by the laser Doppler vibrometer 40.

Since the vibration device 10 has been described with reference to FIGS. 1 and 2, the description thereof will not be repeated in the present embodiment. In the inspection system S, the vibration device 20 illustrated in FIG. 3 may be used instead of the vibration device 10.

An operator (not illustrated in FIG. 5) who uses the inspection system S holds the vibration device 10 in a state in which the end part 11*a*2 is directed to the surface Ts of the target T.

The control section 30 transmits, to the laser light source 13, a control signal for generating pulsed laser light L. As a result, the vibration device 10 outputs, from the end part 11*a*2, an LIP shock wave Wi which propagates along the central axis direction of the shock tube 11 (see FIG. 1).

The laser Doppler vibrometer 40 is an example of the vibration measurement device that measures vibration at the surface Ts of the target T. The laser Doppler vibrometer 40 can measure vibration at the surface Ts without making contact with the surface Ts. Note, however, that the vibration measurement device is not limited to the laser Doppler vibrometer 40, and may be a laser displacement meter. The laser Doppler vibrometer 40 and the laser displacement meter are each a noncontact-type vibration measurement device. The vibration measurement device may be a contact-type vibration measurement device such as an acceleration sensor.

The vibration device 10 and the laser Doppler vibrometer 40 may be configured in a state of being separated from each other as illustrated in FIG. 5, or may be integrated with each other.

Since the inspection system S includes the vibration device 10, the inspection system S brings about an effect similar to that of the vibration device 10. The inspection system S can also measure vibration at the surface Ts using the laser Doppler vibrometer 40. Therefore, the inspection system S can carry out a laser hammering test using the LIP shock wave Wi.

The laser hammering test is a non-contact and non-destructive method for inspecting whether a defect has occurred inside a structure such as a road tunnel. Therefore, examples of the target T include hammering test objects such as concrete walls, tile walls, reinforcing bars, metal columns, metal pipes, tiles, and fruits. In the present embodiment, as illustrated in FIG. 5, a concrete test piece in which a defect Td is provided inside in advance is employed as the target T. The laser hammering test using the LIP shock wave Wi does not scratch the surface Ts. Therefore, the inspection system S can also carry out the laser hammering test on a target T on which tiles for decoration are attached to a surface thereof, a target T on which a picture for decoration is drawn on a surface thereof, and the like.

The vibration device 10 can apply the LIP shock wave Wi to the surface Ts of the target T and carry out the laser hammering test by adjusting the direction of the end part 11*a*2 in a state of being held by the operator. This is because, for example, when the laser induced vibration wave measurement system described in FIG. 1 of International Publication No. WO2019/189429 is compared with the inspection system S, a galvano scanner unit, a biaxial mirror unit, and the like for moving laser light can be omitted in the vibration device 10. Therefore, the inspection system S can be downsized as compared with an inspection system in which a conventional laser hammering test is carried out.

[Additional Remarks]

The present invention is not limited to the embodiments, but can be altered by a skilled person in the art within the scope of the claims. The present invention also encompasses, in its technical scope, any embodiment derived by combining technical means disclosed in differing embodiments.

Aspects of the present invention can also be expressed as follows:

A vibration device in accordance with aspect 1 of the present invention includes: a condenser lens; and a shock tube in which a first end of an internal space is sealed by the condenser lens and a second end of the internal space is opened, laser light being supplied to the shock tube via the condenser lens, and a laser induced plasma shock wave being output from the second end. In the vibration device, the condenser lens is configured to condense the laser light in the internal space of the shock tube.

According to the above configuration, the shock tube propagates, while guiding, an LIP shock wave generated at a condensing point to the second end of the internal space, and outputs the LIP shock wave from the second end. Therefore, in the vibration device, by directing the second end toward a surface of a target, LIP shock waves in the same propagation direction can be applied to the surface of the target. As a result, in a technique to vibrate a target using an LIP shock wave, the vibration device can enhance efficiency of vibrating the target, as compared with a technique using the acoustic lens described in Non-Patent Literature 1.

The vibration device in accordance with aspect 2 of the present invention employs, in addition to the configuration of the vibration device in accordance with the above aspect 1, a configuration of further including: a laser light source that emits the laser light; and an optical system that couples the laser light to the condenser lens.

According to the above configuration, it is possible to reliably condense laser light in the internal space of the shock tube.

The vibration device in accordance with aspect 3 of the present invention employs, in addition to the configuration of the vibration device in accordance with the above aspect 1 or 2, a configuration in which: in the internal space, an absorption section that absorbs the laser light is provided at least on an inner wall of a section extending from a condensing point, at which the laser light is condensed, to the second end.

According to the above configuration, the absorption section absorbs the laser light after laser induced plasma is generated at the condensing point. Therefore, it is possible to reduce laser light that leaks to the outside of the shock tube.

An inspection system in accordance with aspect 4 of the present invention includes: the vibration device in accordance with any one of the above aspects 1 through 3, the vibration device vibrating a target with use of the laser induced plasma shock wave; and a vibration measurement device that measures vibration on a surface of the target.

The inspection system brings about an effect similar to that of the vibration device in accordance with any one of aspects 1 through 3 of the present invention. Further, the present inspection system can measure vibration at a surface of a target using the vibration measurement device. Therefore, the present inspection system can carry out a laser hammering test using an LIP shock wave.

A vibration method in accordance with aspect 5 of the present invention is a vibration method for generating a laser induced plasma shock wave with use of a shock tube in which a first end of an internal space is sealed by a condenser lens and a second end of the internal space is opened. The vibration method includes: a first step of emitting laser light toward the condenser lens; a second step of condensing the laser light in the internal space of the shock tube to generate a laser induced plasma shock wave; and a third step of outputting the laser induced plasma shock wave from the second end.

The inspection method brings about an effect similar to that of the vibration device in accordance with aspect 1 of the present invention.

EXAMPLES

The following description will discuss Examples 1 through 6 of the present invention and Comparative Examples 1 and 2, with reference to FIGS. 6 through 16. FIG. 6 is a schematic diagram illustrating vibration methods of Comparative Example 1, Comparative Example 2, and Examples 1 through 6 of the present invention.

(a) and (b) of FIG. 7 are graphs indicating time dependency of vibration strength obtained by vibration methods in Comparative Example 1 and Comparative Example 2. (a) through (c) of FIG. 8 are graphs indicating time dependency of vibration strength obtained by vibration methods in Examples 1 through 3 of the present invention. (a) through (c) of FIG. 9 are graphs indicating time dependency of vibration strength obtained by vibration methods in Examples 4 through 6 of the present invention.

(a) and (b) of FIG. 10 are graphs indicating power spectra of vibration obtained by the vibration methods in Comparative Example 1 and Comparative Example 2. (a) through (c) of FIG. 11 are graphs indicating power spectra of vibration obtained by the vibration methods in Examples 1 through 3 of the present invention. (a) through (c) of FIG. 12 are graphs indicating power spectra of vibration obtained by the vibration methods in Examples 4 through 6 of the present invention.

FIG. 13 is a graph indicating a strength ratio of a basic vibration mode in terms of power spectrum of vibration obtained by vibration methods in Comparative Example 1, Comparative Example 2, and Examples 1 through 6 of the present invention. Note that, in FIG. 13, a vibration mode in which a frequency is close to 1400 Hz in power spectra illustrated in FIGS. 10 through 12 is used as a basic vibration mode.

FIG. 14 is a graph indicating time dependency of impact pressure of vibration obtained in vibration methods in Comparative Example 2 and Examples 1 through 6 of the present invention.

FIG. 15 is a graph indicating peak strengths of impact pressure of vibration obtained by the vibration methods in Comparative Example 2 and Examples 1 through 6 of the present invention. FIG. 16 is an image showing a surface of a tile to which vibration methods in Comparative Example 1 and Example 3 of the present invention have been applied.

In Examples 1 through 6 of the present invention and Comparative Examples 1 and 2, a stationary pulse YAG laser light source was employed as a laser light source that emits laser light L. As shown in the upper part of FIG. 6, in the vibration method of Comparative Example 1, a laser ablation (LA) method was used. Specifically, the laser light L was condensed at the condensing point Pf with use of a condenser lens Lc. Here, the condenser lens Lc is a lens configured in a manner similar to that of the condenser lens 12. In the vibration method of Comparative Example 1, LA at the surface Ts was generated by causing the condensing point Pf to conform to the surface Ts of the target T. The surface Ts was vibrated by a reaction of LA.

As illustrated in the middle part of FIG. 6, in the vibration method of Comparative Example 2, an LIP shock wave method was used. Specifically, the laser light L was condensed at the condensing point Pf with use of a condenser lens Lc. In the vibration method of Comparative Example 2, a distance between the condensing point Pf and the surface Ts was set to 30 mm. The surface Ts was vibrated by an LIP shock wave at the condensing point Pf.

As illustrated in the lower part of FIG. 6, in the vibration method of Examples 1 through 6 of the present invention, the vibration method M10 (see FIG. 4) was used. In the vibration device 10, a length of the second section S2 was set to 10 mm, and a distance from the end part 11*a*2 to the surface Ts was set to 20 mm. In Examples 1 through 6, the inner diameters φ of the main tube 113 (see (a) of FIG. 2) was set to 25 mm, 15 mm, 11 mm, 9 mm, 8 mm, and 6 mm, respectively.

Note that, in all of Examples 1 through 6 and Comparative Examples 1 and 2, the wavelength of laser light L was 1064 nm, and the power of laser light L was 150 mJ. Moreover, a concrete test piece was used as the target T.

With reference to FIGS. 8 and 9, it has been found that the vibration method of Example 3 (φ=11 mm) could vibrate the surface Ts most strongly, as a result of comparison among the vibration methods of Examples 1 through 6.

With reference to FIG. 7 and (c) of FIG. 8, it has been found that the vibration method of Example 3 could vibrate the surface Ts more strongly than Comparative Examples 1 and 2.

The graphs of FIGS. 10 through 12 indicate power spectra obtained by Fourier transformation of time dependency of vibration strengths shown in the respective graphs of FIGS. 7 through 9.

With reference to FIGS. 10 through 12, it has been found that, in the vibration methods of Examples 1 through 3 and 6, the strength of vibration appearing at approximately 1400 Hz was increased, as compared with the vibration methods of Comparative Examples 1 and 2. In addition, it has been found that the strongest vibration strength was obtained in the vibration method of Example 3, when the vibration methods of Examples 1 through 6 were compared.

FIG. 13 shows ratios of peak strengths of the basic vibration mode obtained in the other vibration methods to a peak strength of the basic vibration mode obtained in the vibration method of Example 3. With reference to FIG. 13, it has been found that the vibration methods of Examples 1 through 3 and 6 could derive stronger vibration strengths than the vibration method of Comparative Example 1, as well as the vibration method of Comparative Example 2. In addition, it has been found that the vibration strength obtained by the vibration method of Example 3 was not less than 100 times as large as the vibration strength obtained by the vibration method of Comparative Example 1.

Table 1 correctively indicates results of carrying out the vibration methods of Comparative Examples 1 and 2 and the vibration method of Example 3.

TABLE 1

| | Comparative Example 1 | Comparative Example 2 | Example 3 |
|---|---|---|---|
| Distance between condensing point Pf and surface Ts | 0 mm | 30 mm | 10 + 20 mm |
| Scratch on surface | Exist | None | None |
| Measure against scattered light | Necessary | Necessary | Unnecessary |
| Power spectrum strength ratio | 0.006 | 0.004 | 1 |

Impact pressures of vibration obtained by the vibration methods of Comparative Example 2 and Examples 1 through 6 of the present invention were measured using newton meters. With reference to FIGS. 14 and 15, it has been found that the impact pressures of vibration obtained by the vibration methods of Examples 1 through 6 of the present invention all exceeded the impact pressure of vibration obtained by the vibration method of Comparative Example 2.

FIG. 16 shows a result of carrying out the vibration method of Comparative Example 1 and the vibration method of Example 3 while changing the target T from the concrete test piece to a tile. For the vibration method of Example 3, the surface Ts of the tile (i.e., the target T) was not scratched even by carrying out the vibration method 10 times. In contrast, for the vibration method of Comparative Example 1 using the LA method, it has been found that a scratch was confirmed even by carrying out the vibration method once, and the scratch became larger as the number of times of carrying out the vibration method increased to three times and to ten times. From this result, it has been found that the vibration method using the LIP shock wave did not scratch the surface Ts of the target T.

REFERENCE SIGNS LIST

S: Inspection system
10, 20: Vibration device
11, 21: Shock tube
11*a*, 21*a*: Internal space
11*a*1, 21*a*1: End part (first end)
11*a*2, 21*a*2: End part (second end)
111: Lens holder
112: Adapter
113: Main tube
1131, 21*d*: Inner wall
114, 214: Absorptive treatment layer (absorption section)
12, 22: Condenser lens
13, 23: Laser light source
14: Collimating lens (optical system)
24: Collimating lens (part of optical system)
15, 25: Lens holder
26: Optical fiber (part of optical system)
30: Control section
40: Laser Doppler vibrometer (vibration measurement device)
T: Target
Ts: Surface

The invention claimed is:

1. A vibration device, comprising:
a condenser lens; and
a shock tube in which a first end of an internal space is sealed by the condenser lens and a second end of the internal space is opened, laser light being supplied to the shock tube via the condenser lens, and a laser induced plasma shock wave being output from the second end;
wherein the shock tube includes a main tube having a cylindrical shape;
wherein the main tube has an end corresponding to the second end of the internal space;
wherein the condenser lens condenses the laser light in an internal space of the main tube.

2. The vibration device as set forth in claim 1, further comprising:
a laser light source that emits the laser light; and
an optical system that couples the laser light to the condenser lens.

3. The vibration device as set forth in claim 1, wherein:
in the internal space, an absorption section that absorbs the laser light is provided at least on an inner wall of a section extending from a condensing point, at which the laser light is condensed, to the second end.

4. An inspection system, comprising:
a vibration device recited in claim 1, the vibration device vibrating a target with use of the laser induced plasma shock wave; and
a vibration measurement device that measures vibration on a surface of the target.

5. A vibration method for generating a laser induced plasma shock wave with use of a shock tube in which a first end of an internal space is sealed by a condenser lens and a second end of the internal space is opened, the shock tube including a main tube having a cylindrical shape;
the main tube having an end corresponding to the second end of the internal space;
said vibration method comprising:
a first step of emitting laser light toward the condenser lens;
a second step of condensing the laser light in an internal space of the main tube to generate a laser induced plasma shock wave; and
a third step of outputting the laser induced plasma shock wave from the second end.

* * * * *